US006435493B1

(12) United States Patent
Hoover

(10) Patent No.: US 6,435,493 B1
(45) Date of Patent: Aug. 20, 2002

(54) SWING ARM CLAMP MECHANISM

(75) Inventor: Harold D. Hoover, Sterling Heights, MI (US)

(73) Assignee: Delaware Capital Formation, Inc., Wilmington, DE (US)

(*) Notice: Subject to any disclaimer, the term of this patent is extended or adjusted under 35 U.S.C. 154(b) by 11 days.

(21) Appl. No.: 09/777,973

(22) Filed: Feb. 6, 2001

(51) Int. Cl.[7] .................................................. B23Q 3/08
(52) U.S. Cl. .......................................................... 269/24
(58) Field of Search .............................. 92/5 R; 269/24, 269/32, 27, 25, 329

(56) References Cited

U.S. PATENT DOCUMENTS

| | | | | |
|---|---|---|---|---|
| 4,086,456 A | * 4/1978 | Bone | ........................... | 92/5 R |
| 4,176,586 A | * 12/1979 | Stoll et al. | ..................... | 92/5 R |
| 4,896,584 A | * 1/1990 | Stoll et al. | ..................... | 92/5 R |
| 5,695,177 A | * 12/1997 | Mascola | ...................... | 269/24 |
| 5,820,118 A | * 10/1998 | Craft | ........................... | 269/24 |

* cited by examiner

*Primary Examiner*—Robert C. Watson
(74) *Attorney, Agent, or Firm*—Dunnin & Dunn, P.C.

(57) ABSTRACT

A fluid operated clamping mechanism comprising, a clamp body having end closure members thereon, a chamber formed within the clamp body, a piston mounted within said chamber for back and forth movement therein, said piston including a magnet associated therewith, a piston rod connected to said piston at one end and a second end of said piston rod extending through the top of the clamp body, a clamp arm being connected to said second end of the piston rod, a first fluid port near said bottom closure member, a second fluid port near said top closure member, said first and second ports being adapted for introduction of a pressure fluid on a first and second side of said piston to thereby cause back and forth movement of the piston rod and which thereby moves the clamp arm between its clamped and un-clamped position, said clamp body containing at least two external surfaces thereon which run lengthwise in the same direction as the piston rod, each of said surfaces containing a different specially grooved slot generally co-extensive with the length of the clamp body, an electronic switch positioned in at least one of said slots, said switch being activated by movement of the magnet included with the piston, to thereby detect the position of the clamp arm.

20 Claims, 4 Drawing Sheets

SWING ARM CLAMP MECHANISM

BACKGROUND OF THE INVENTION

This invention broadly relates to a new design of a swing arm clamping mechanism. More specifically, the invention relates to new fluid operated clamping mechanism which includes a specially designed clamp body including a piston and cylinder chamber arrangement, with one end of the piston rod being connected to a clamp arm, and one or more electronic switches associated with the clamp body to detect the position of the clamp arm.

SUMMARY OF THE INVENTION

Figure 1:
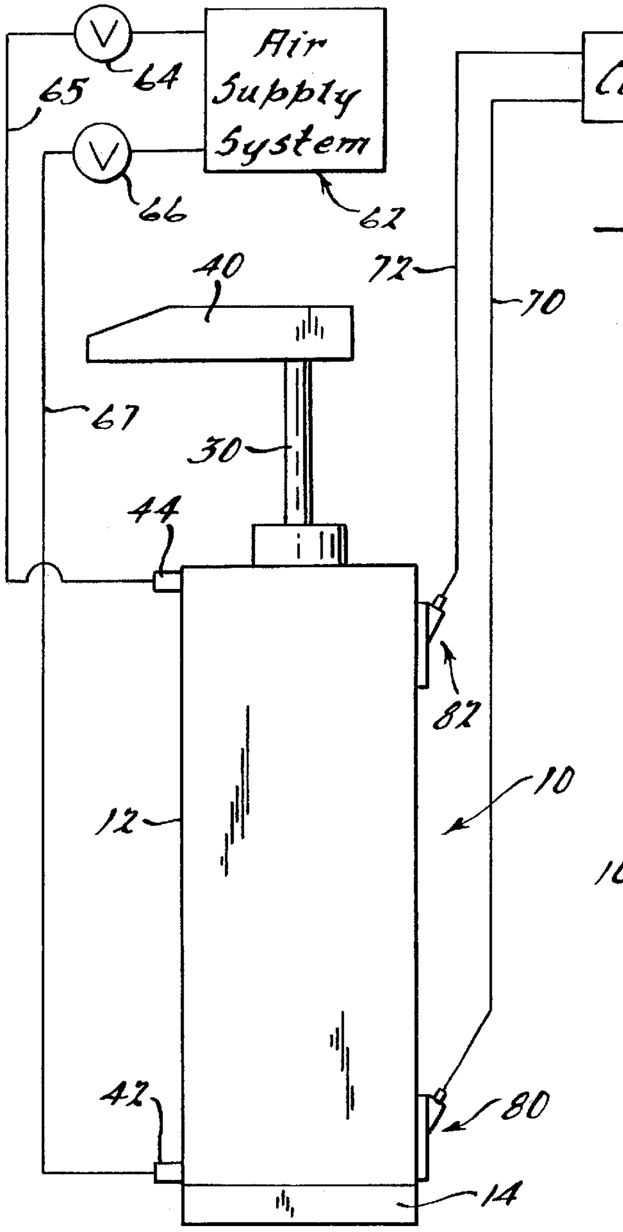
FIG. 1 illustrates a schematic diagram of a fluid operated clamping mechanism in accordance with the invention.

Briefly stated, the present invention involves a fluid operated clamping mechanism comprising, a clamp body having a bottom closure member and a top closure member, a chamber formed within the clamp body, a piston mounted within said chamber for back and forth movement therein, said piston including a magnet associated therewith, a piston rod connected to said piston at one end and a second end of said piston rod extending through the top closure member of the clamp body, a clamp arm being connected to said second end of the piston rod, a first fluid port near said bottom closure member, a second fluid port near said top closure member, said first and second ports being adapted for introduction of a pressure fluid on a first and second side of said piston to thereby cause back and forth (or up and down) movement of the piston rod to thereby move the clamp arm between its clamped and un-clamped position, said clamp body containing at least three external surfaces thereon which run lengthwise in the same direction as the piston rod, each of said surfaces containing a different specially grooved slot generally co-extensive with the length of the clamp body, an electronic switch positioned in at least one of said slots, said switch being activated by movement of the magnet included with the piston, to thereby detect the position of the clamp arm.

DESCRIPTION OF THE PREFERRED EMBODIMENTS AND BEST MODE OF THE INVENTION

The preferred embodiments of the invention are now to be described in connection with the drawing FIGS. 1–11. The same element numbers in different drawing FIGURES shall indicate like elements.

Figure 2:
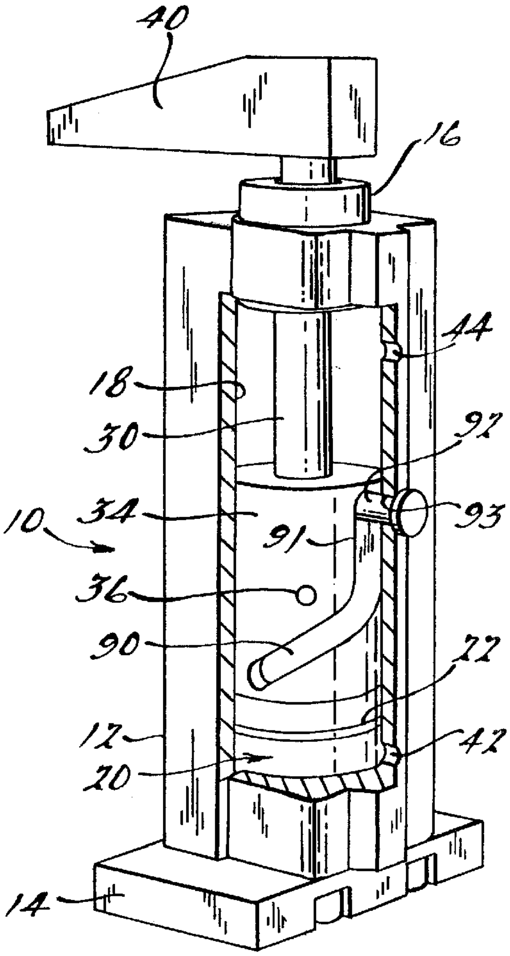
FIG. 2 illustrates an up-right view of the clamping mechanism of FIG. 1, showing the clamp body and clamp arm, and with the clamp body being shown in partially cut-a-way section.
Figure 2A:
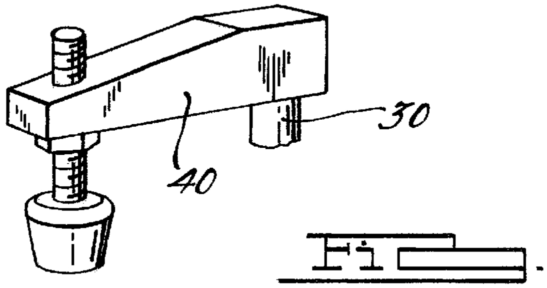
FIG. 2*a* shows an alternative embodiment of the clamp arm, which may be substituted for the clamp arm shown in FIG. 2.
Figure 9:
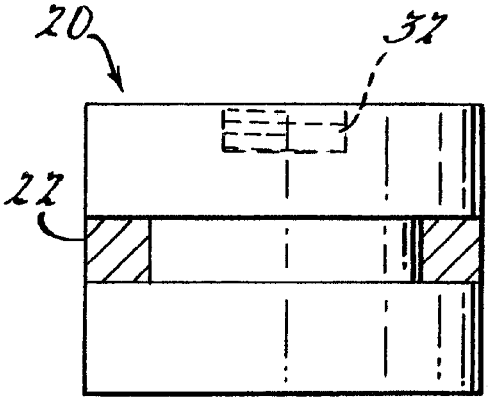
FIG. 9 illustrates a view of the circular magnet shaped member used at the bottom of the piston rod in FIG. 2.
Figure 10:
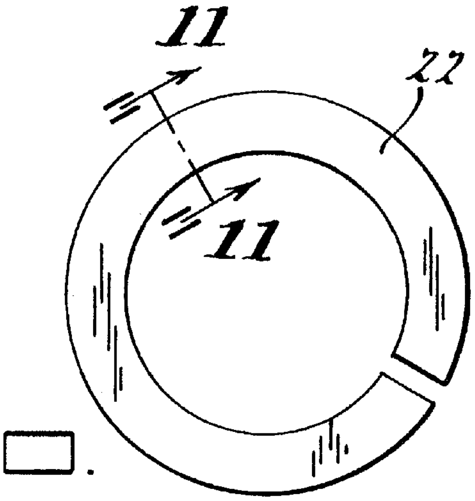
FIG. 10 illustrates the donut shaped magnet used in the cylindrical magnet carrier member of FIG. 9.
Figure 11:
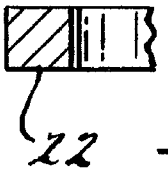
FIG. 11 illustrates a cross-sectional view taken along the line 11—11 in FIG. 10.

FIGS. 1 and 2 illustrate the fluid operated clamping mechanism designated 10. The clamping mechanism 10 includes a clamp body 12 having a bottom closure member 14 and top closure member 16. A chamber 18 is formed within the clamp body 12; and, the chamber contains a piston designated 20 (see FIGS. 2 and 9). The piston member 20 also includes a magnet 22 (see FIG. 2, and FIGS. 9–11). The magnet 22 may be of numerous different shapes, and for example, as shown in FIGS. 2, 9 and 10 the preferred magnet shape is generally circular. A piston rod 30 is connected to the magnet 20 through means of a threaded aperture designated 32 (see FIG. 9). The piston rod 30 also extends through a follower member 34, with the follower member 34 being fixedly connected to the piston rod 30 through use of a pin member 36 which passes through the follower member 34 and connects with a similar mating aperture (not shown) within the piston rod 30.

A clamp arm 40 is connected to the upper end of the piston rod 30 and is moved in and up-and-down direction or from a locked to an unlocked position by upward and downward movement of the piston rod 30.

A first fluid port 42 is positioned near the bottom of the chamber 18, and a second fluid port 44 is positioned near the top of the chamber 18. The purpose of the first and second fluid ports 42, 44 is for introduction of a pressure fluid on a first and second side of the piston to thereby cause back and forth (or up and down) movement of the piston rod, which accordingly moves the clamp arm between its clamped and unclamped positions.

The piston 20 is made of a non-ferrous material, such as for example a non-ferrous metal or any other suitable non-ferrous metal or plastic material capable of sliding movement back and forth or up and down within the chamber 18. The magnet 22 is made of a ferrous magnetic material, that is, any suitable magnetic material for purposes which will be described hereinafter.

The clamp body 12 contains three or more external surfaces thereon which run lengthwise in the same direction as the piston rod. With reference now to FIG. 1 it will be seen that the clamping mechanism 10 is part of a schematic diagram or schematic system which includes a controller box 60 and an air supply system 62 regulate by suitable valve mechanisms labeled 64 and 66. The valve mechanisms regulated the inlet and outlet flow of suitable pressurized fluid to the lower port 42 and the upper port 44. Line 65 conducts the pressurized fluid or pressurized air to the fluid port 44 and line 67 conducts the pressured fluid or pressurized air to fluid port 42.

Also in relation to the schematic diagram of FIG. 1, it will be seen that the controller box 60 is electrically connected through suitable wiring or electrical conduits 70 and 72 to the electronic switches designated 80 and 82. The electronic switches such as those designated 80 and 82, are activated by movement of the magnet 22 within the chamber 18, to thereby enable detection of the position of the clamp arm 40 through appropriate control circuits and controller means in the controller box 60.

The follower member 34 is now to be described (see FIG. 2). The follower member 34 is generally circular in shape or it can be of any shape which will slide in an up-and-down direction within a chamber, such as 18. The follower member 34 is typically made of a hard plastic material such as nylon or any other suitable firm or hard plastic material. The follower member 34, as previously mentioned, is fixedly attached to the piston rod 30 through means of the pin 36 which passes through the follower member and into the heart of the piston rod 30 through suitable close fitting apertures. The purpose of the follower member is as follows;—when the follower member is moved in an upward or downward direction through corresponding movement of the piston 20, the slot 90 formed in the outer surface of the follower member 34, follows the direction given to it by the fixed pin 92 which is positioned through the wall of the clamp body 12 (by use of the aperture 93). When the cam surface or slot 90 follows the direction given to it through relative movement up and down against the pin 92, this causes the clamp arm 40 to at first rise up the general amount of the length of the first vertical portion 91 of the slot 90; then when the upward movement causes the pin to reach the angled surface 92 of the cam slot 90, this causes the clamp arm 40 to be radially moved in a direction away from the work piece surface, as will be appreciated from the structural orientation of cam slot. Such radial movement of the clamp arm 40 is uniquely beneficial in that it permits the clamp arm to be moved radially away from the work piece (or mechanism being clamped) during the upward movement of the piston rod 30 which causes the clamp arm to be lifted up away from the work piece and rotated in a radial direction away from the work piece itself. This permits easier placement and/or removal of the work piece during the clamping operation.

Figure 3:
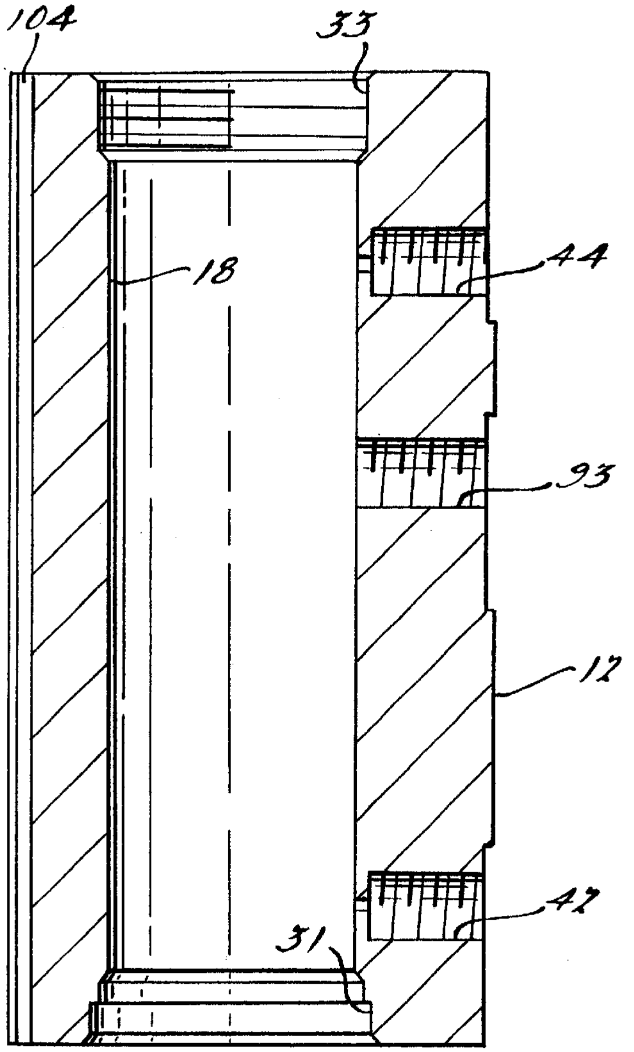
FIG. 3 shows a more detailed view in cross-section of the clamp body.
Figure 5:
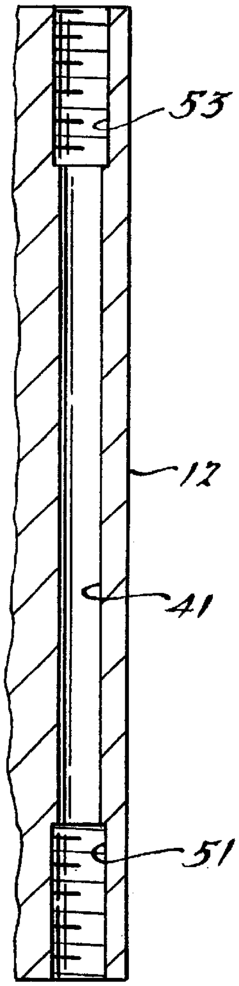
FIG. 5 shows a cross-section view taken along the line 5—5 in FIG. 4.
Figure 4:
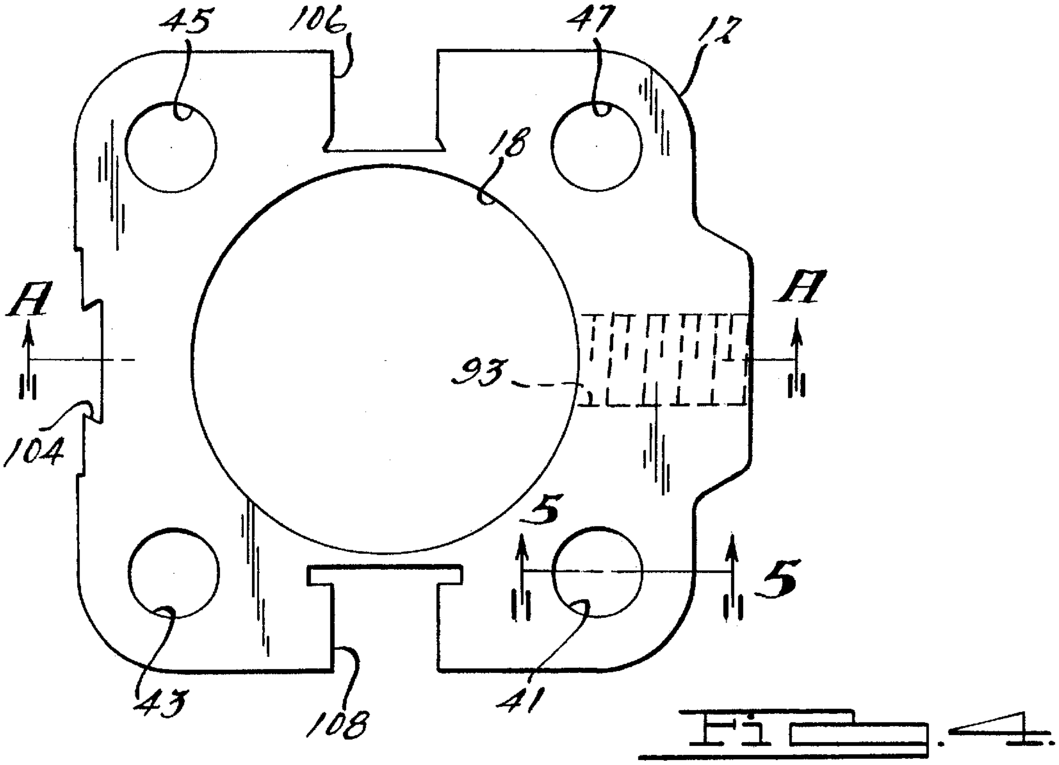
FIG. 4 shows a top view of a clamp body shown in FIG. 3 (the cross-section of FIG. 3 is taken along line A—A in FIG. 4)

FIGS. 3, 4 and 5 show the clamp body 12 in more detail. As shown in FIGS. 4 and 5 the clamp body 12 contains four throughput holes or bores designated 41, 43, 45 and 47. As shown in FIG. 5, which is a cross-sectional view along the line 5—5 in FIG. 4; a typical throughput hole 41 contains threaded end portions 51 and 53. These threaded throughput holes 41, 43, 45 and 47 allow a bottom support plate (e.g. plate member 14) to be screwed on to the clamp body 12. And for example, a top closure member or plate can be screwed on the top of the clamped body, for example at the threaded aperture 53, or the top holes can simply be filed in with four threaded plugs (not shown). As shown in FIG. 3, the clamp body 12 contains a bottom aperture 31 and a top aperture 33 which enable various types of plugs (or closure members) to be fitted into the bottom and top of the clamp body 12, either threaded or otherwise. The top plug or closure member 16 (shown in FIG. 2) would typically be a threaded plug with a throughput aperture for the piston rod 30.

It will be noted that in FIGS. 2 and 4, the cam follower pin 92 would be inserted into the clamp body 12 through the aperture or threaded bore 93 shown in FIG. 4. Whereas in the alternative embodiment of the clamp body 12*a*, shown in FIG. 4*a*, the follower pin 92 would be inserted in a slightly different position or offset position designated 93*a*. Aperture 93*a* is a threaded bore through which the cam pin 92 may also be inserted or positioned.

Figure 6:
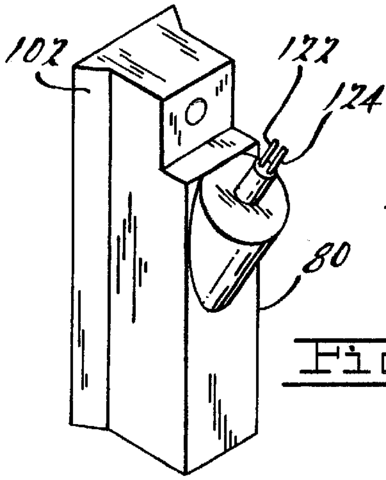
FIG. 6 shows an enlarged view of an electronic switch of the type used in FIG. 1.
Figure 7:
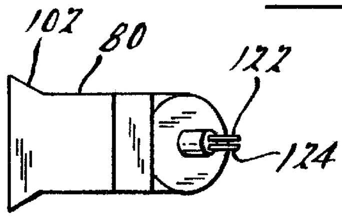
FIG. 7 shows a top view of the electronic switch shown in FIG. 5.
Figure 8:
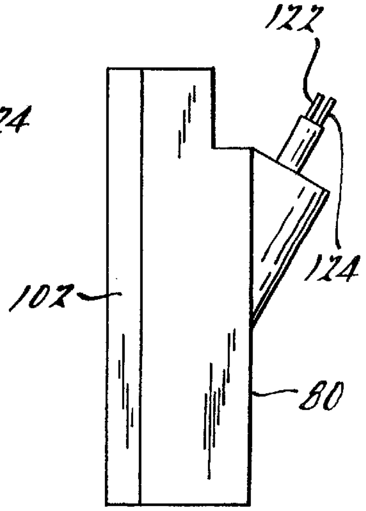
FIG. 8 shows a side view of the electronic switch shown in FIG. 5.

FIGS. 6, 7 and 8 illustrate an electronic switch 80 or 82 as shown in FIG. 1. The types of electronics switches 80 or 82 used in the invention have a specially shaped mounting flange 102 on the rear side thereof. The mounting flange 102 is shaped such that it will fit within a specially grooved slot 104 which runs the length of the clamp body 12. The specially grooved slot 104 is shown in the clamp bodies illustrated in both FIG. 4 and FIG. 4*a*; and, the electronic switch 80 or 82 can be slid up and down, or positioned within slot 104 (or other suitably designed slots) to any height along the length of the clamp body 12 or 12*a*.

Figure 4A:
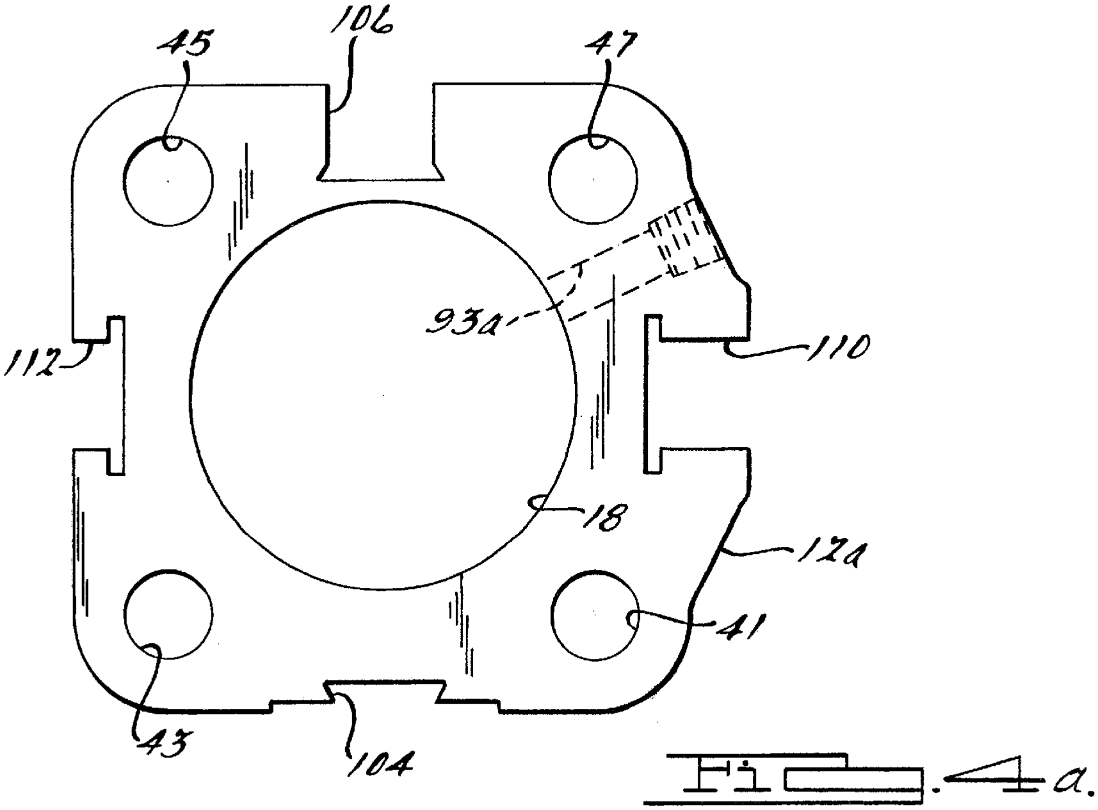
FIG. 4*a* shows an alternative embodiment of the clamp body of FIG. 4.

It is a unique feature of the invention that numerous different shapes of these specially grooved slots can be used in the clamp body 12 or 12*a* as shown by the other slots 106, 108 in FIG. 4; and slots 104, 106, 110 and 112 in FIG. 4*a*. This unique feature of the invention permits the usage of numerous different types of mounting flanges on the electronic switches 80 or 82 for purposes of various types of slotted mounting arrangements on the clamp bodies 12 or 12*a*.

A further description is now given of the electronic switches (80, 82) used in the invention. These electronic switches are preferably a reed magnet which is type of magnet used as shown by the magnet 22 in FIGS. 2, 9, 10 and 11. Other types of magnets may also be used. As a preferred embodiment (although other embodiments will be apparent to those skilled in the art), the function of the electronic switch 80 or 82 is normally open; its switching voltage may be from 6 to 24 VDC; its switching current is preferably 0.20 amps max; its switching power is preferably 4.8 watts max; its switching speed is 1.5 micro seconds to operate/0.5 micro seconds to release; its voltage drop is preferably 1.0 volts max and its magnetic sensitivity is 25 gauss (measured at 0.1 inch above the sensing surface). The electronic switch 80 (e.g., see FIGS. 6, 7 and 8) has lead wires 122, 124 which may be approximately up to 9 or 15 feet in length to thereby connect with a controller box 60 (see FIG. 1).

A special technical advantage of the invention is that each specially grooved slot 104, 106, 108, 110 or 112, etc. used in the clamp bodies 12 or 12*a* has a different slot cross-section, each one of which will accommodate and receive corresponding shaped flanges on the electronic switches discovered or selected for use in the invention. It is preferred that the pressure fluid used in the invention be pressurized air, however, as will be apparent to those skilled in the art, any suitable pressurized fluid, liquid or gas may be utilized. Another special feature of the invention is that the cylindrical member 34 positioned in the cylinder chamber 18 just above the piston 20 has a cam slot therein, and a cam follower pin extends through a mid-portion of the clamp body to mate with the cam slot and to thereby produce a camming action when the cylindrical member is moved back and forth (or up and down) within the chamber 18. This camming action uniquely causes the clamp arm to rotate in a radial direction relative to the central longitudinal axis of the piston rod. All of these features described above in this specification are highly technically advantageous in producing a highly useful clamping mechanism.

While it will be apparent that the preferred embodiments of the invention disclosed are well calculated to fulfill the objects, benefits, and/or advantages of the invention, it will be appreciated that the invention is susceptible to modification, variation and change without departing from the proper scope of fair meaning of the subjoined claims.

What is claimed is:

1. A fluid operated clamping mechanism comprising, a clamp body having a bottom closure member and a top closure member, a chamber formed within the clamp body, a piston mounted within said chamber for back and forth movement therein, said piston including a magnet associated therewith, a piston rod connected to said piston at one end and a second end of said piston rod extending through the top closure member of the clamp body, a clamp arm being connected to said second end of the piston rod, a first fluid port near said bottom closure member, a second fluid port near said top closure member, said first and second ports being adapted for introduction of a pressure fluid on a first and second side of said piston to thereby cause back and forth movement of the piston rod and which thereby moves the clamp arm between its clamped and un-clamped position, said clamp body containing at least three external surfaces thereon which run lengthwise in the same direction as the piston rod, each of said surfaces containing a different specially grooved slot generally co-extensive with the length of the clamp body, an electronic switch positioned in at least one of said slots, said switch being activated by movement of the magnet included with the piston, to thereby detect the position of the clamp arm.

2. The clamping mechanism of claim 1 wherein, two of said electronic switches are positioned in at least one of said slots, to thereby enable detection of the open and closed-clamped positions of said clamp-arm.

3. The clamping mechanism of claim 1 wherein, each said specially grooved slot present in each of said surfaces has a different slot cross-section, each one of which slots will accommodate and receive corresponding cross-section shaped electronic switches.

4. The clamping mechanism of claim 2 wherein, each said specially grooved slot present in each of said surfaces has a different slot cross-section, each one of which slots will accommodate and receive corresponding shaped electronic switches.

5. The clamping mechanism of claim 1 wherein, said pressure fluid is pressurized air.

6. The clamping mechanism of claim 1 wherein, said magnet has a collar-like shape and is positioned in a complementary recess formed in the exterior of the piston which is made of a non-ferrous material.

7. The clamping mechanism of claim 2 wherein, each said specially grooved slot present in each of said surfaces has a different slot cross-section, each one of which slots will accommodate and receive corresponding cross-section shaped electronic switches.

8. The clamping mechanism of claim 1 wherein, a cylindrical member is positioned in said cylindrical chamber just above the piston, said cylindrical member having a cam slot therein, a cam follower pin extending trough a mid-portion of the clamp body and mating with the cam slot to produce a camming action when the cylindrical member is moved back and forth within said chamber, said camming action causing the clamp arm to rotate in a radial direction relative to the central longitudinal axis of the piston rod.

9. The clamping mechanism of claim 2 wherein, a cylindrical member is positioned in said cylindrical chamber just above the piston, said cylindrical member having a cam slot therein, a cam follower pin extending trough a mid-portion of the clamp body and mating with the cam slot to produce a camming action when the cylindrical member is moved back and forth within said chamber, said camming action causing the clamp arm to rotate in a radial direction relative to the central longitudinal axis of the piston rod.

10. The clamping mechanism of claim 4 wherein, a cylindrical member is positioned in said cylindrical chamber just above the piston, said cylindrical member having a cam slot therein, a cam follower pin extending trough a mid-portion of the clamp body and mating with the cam slot to produce a camming action when the cylindrical member is moved back and forth within said chamber, said camming action causing the clamp arm to rotate in a radial direction relative to the central longitudinal axis of the piston rod.

11. A fluid operated clamping mechanism comprising, a clamp body having end closure members thereon, a chamber formed within the clamp body, a piston mounted within said chamber for back and forth movement therein, said piston including a magnet associated therewith, a piston rod connected to said piston at one end and a second end of said piston rod extending through the top of the clamp body, a clamp arm being connected to said second end of the piston rod, a first fluid port near said bottom closure member, a second fluid port near said top closure member, said first and second ports being adapted for introduction of a pressure fluid on a first and second side of said piston to thereby cause back and forth movement of the piston rod and which thereby moves the clamp arm between its clamped and un-clamped position, said clamp body containing at least two external surfaces thereon which run lengthwise in the same direction as the piston rod, each of said surfaces containing a different specially grooved slot generally co-extensive with the length of the clamp body, an electronic switch positioned in at least one of said slots, said switch being activated by movement of the magnet included with the piston, to thereby detect the position of the clamp arm.

12. The clamping mechanism of claim 11 wherein, said magnet has a collar-like shape and is positioned in a complementary recess formed in the exterior of the piston which is made of a non-ferrous material.

13. The clamping mechanism of claim 11 wherein, two of said electronic switches are positioned in at least one of said slots, to thereby enable detection of the open and closed-clamped positions of said clamp-arm, and wherein said pressure fluid is pressurized air.

14. The clamping mechanism of claim 11 wherein, each said specially grooved slot present in each of said surfaces has a different slot cross-section, each one of which slots will accommodate and receive corresponding cross-section shaped electronic switches.

15. The clamping mechanism of claim 13 wherein, each said specially grooved slot present in each of said surfaces has a different slot cross-section, each one of which slots will accommodate and receive corresponding shaped electronic switches.

16. The clamping mechanism of claim 13 wherein, said magnet has a collar-like shape and is positioned in a complementary recess formed in the exterior of the piston which is made of a non-ferrous metal.

17. The clamping mechanism of claim 14 wherein, two of said electronic switches are positioned in at least one of said slots, to thereby enable detection of the open and closed-clamped positions of said clamp-arm.

18. The clamping mechanism of claim 17 wherein, said magnet has a collar-like shape and is positioned in a complementary recess formed in the exterior of the piston which is made of a non-ferrous metal.

19. The clamping mechanism of claim 11 wherein, a cylindrical member is positioned in said cylindrical chamber just above the piston, said cylindrical member having a cam slot therein, a cam follower pin extending trough a mid-portion of the clamp body and mating with the cam slot to produce a camming action when the cylindrical member is moved back and forth within said chamber, said camming action causing the clamp arm to rotate in a radial direction relative to the central longitudinal axis of the piston rod.

20. The clamping mechanism of claim 12 wherein, a cylindrical member is positioned in said cylindrical chamber just above the piston, said cylindrical member having a cam slot therein, a cam follower pin extending trough a mid-portion of the clamp body and mating with the cam slot to produce a camming action when the cylindrical member is moved back and forth within said chamber, said camming action causing the clamp arm to rotate in a radial direction relative to the central longitudinal axis of the piston rod.

* * * * *

UNITED STATES PATENT AND TRADEMARK OFFICE
Certificate

Patent No. 6,435,493 B1 Patented: August 20, 2002

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Harold D. Hoover, Sterling Heights, MI; and Daniel M. Cary, Sr., White Lake, MI.

Signed and Sealed this Second Day of September 2003.

JOSEPH J. HAIL, III
*Supervisory Patent Examiner*
Art Unit 3723